US012501887B2

(12) United States Patent
Hu et al.

(10) Patent No.: US 12,501,887 B2
(45) Date of Patent: Dec. 23, 2025

(54) LONG-DISTANCE TRANSPORTATION CASE AND TRANSPORTATION METHOD FOR BLACK SOLDIER FLY EGGS AND LARVAE

(71) Applicant: BIOFORTE BIOTECHNOLOGY (SHENZHEN) CO., LTD., Shenzhen (CN)

(72) Inventors: Wenfeng Hu, Shenzhen (CN); Jiaojiao Qi, Shenzhen (CN); Jianfeng Zhu, Shenzhen (CN); Xuesheng Hu, Shenzhen (CN); Jincai Li, Shenzhen (CN)

(73) Assignee: BIOFORTE BIOTECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/651,744

(22) Filed: May 1, 2024

(65) Prior Publication Data
US 2024/0417157 A1  Dec. 19, 2024

(30) Foreign Application Priority Data
Jun. 16, 2023 (CN) .......................... 202310718849.1

(51) Int. Cl.
*A01K 67/362* (2025.01)
*B65D 81/18* (2006.01)
*B65D 81/38* (2006.01)
*B65D 85/50* (2006.01)

(52) U.S. Cl.
CPC ............ *A01K 67/362* (2025.01); *B65D 81/18* (2013.01); *B65D 81/3827* (2013.01); *B65D 81/3834* (2013.01); *B65D 85/50* (2013.01)

(58) Field of Classification Search
CPC .................................................. A01K 67/362
USPC .............. 220/592.2, 592.24, 592.25, 592.26, 220/592.27
See application file for complete search history.

(56) References Cited

U.S. PATENT DOCUMENTS 12,114,647 B2 * 10/2024 Massaro ................ B65B 63/08

* cited by examiner

*Primary Examiner* — Christopher D Hutchens
*Assistant Examiner* — Nevena Aleksic
(74) *Attorney, Agent, or Firm* — Jose Cherson Weissbrot (57) ABSTRACT

The present application provides a long-distance transportation case for long-distance transportation of black soldier fly eggs and larvae, including a case body, a case cover, and a plurality of insulation components inside the case body; wherein the insulation component comprises a sealed bag with a phase-transition material filled therein; and the plurality of insulation components are arranged in the transportation case to form a holding space for accommodating the egg boxes. The present application also provides a transportation method for black soldier fly eggs and larvae.

6 Claims, 5 Drawing Sheets

LONG-DISTANCE TRANSPORTATION CASE AND TRANSPORTATION METHOD FOR BLACK SOLDIER FLY EGGS AND LARVAE

CROSS-REFERENCE TO RELATED APPLICATIONS

The present application is based upon and claims priority to Chinese Patent Application No. 202310718849.1, filed on Jun. 16, 2023, the entire contents of all of which are incorporated herein by reference.

TECHNICAL FIELD

The present application relates to the field of transportation of black soldier fly eggs and larvae within 5-day-old, in particular, to a long-distance transportation case for black soldier fly eggs and larvae and the transportation method thereof.

BACKGROUND

Black soldier fly (*Hermetia illucens*) is a kind of saprophytic insect in the family of Stratiomyidae, which is able to feed on livestock manure and household waste to produce high-value animal protein feed. Because it has advantages including rapid reproduction, large biomass, wide feeding habits, high absorption and conversion rate, easy management, low breeding cost, and good animal palatability, it's now utilized as resources, becoming a resource insect that is well-known together with maggots, yellow mealworms, and superworms, etc. which are popularized all over the world, and is widely used in treating wastes, such as gallinaceous manure, swine manure, and kitchen wastes.

Currently, there is a huge demand for black soldier flies in production and life, so in order to meet such huge demand, the black soldier flies are mainly bred in centralized mode and then transported throughout the country. The period when black soldier flies dispose of household waste is the larval stage, and since the larval stage lasts only 15 days, the black soldier fly eggs (hereinafter referred to as "the eggs") are usually hatched after being transported to the destination in order to increase the waste disposal efficiency of the black soldier flies.

The eggs are mainly transported in cardboard cases with air holes, or foam cases with ice bags in summer, and usually in foam cases in winter. However, in high-temperature or low-temperature seasons, since the cardboard case can't control the temperature, and the foam case can't control the temperature with satisfying effects, the eggs will be subjected to drastic temperature changes, which will lead to the death of some of the eggs and the decrease of the hatching rate. If a thermostatic system is adopted for transportation, a specific transport vehicle with a thermostatic compartment will be required, which is very restrictive and can increase the cost significantly.

SUMMARY

In order to ameliorate the present problem that the eggs are likely to die during transportation due to drastic temperature changes, one purpose of the present application is to provide a method of transporting the eggs and larvae over a long distance.

The present application provides a case and method for transporting the eggs and larvae over long distances using the following technical solution:

A transportation case for long-distance transportation of black soldier fly eggs and larvae, which comprises: a case body, a case cover, and a plurality of insulation components inside the case body;

wherein the insulation component comprises a sealed bag with a phase-transition material filled therein, the phase-transition material has a phase-transition temperature range of 17~22° C. at which the material will be transformed from solid to fluid; and the plurality of insulation components are arranged in the transportation case to form a holding space for accommodating the egg boxes.

Preferably, an inner wall of the case body and an inner wall of the case cover are provided with an insulation layer.

Preferably, the insulation layer comprises an aluminum foil layer and a pearl cotton layer, with one side of the aluminum foil layer being adhered to the inner walls of the case body and the case cover, and the pearl cotton layer being adhered to another side of the aluminum foil layer.

Preferably, an outer wall of the case body is provided with a sealing layer which is configured to seal a gap between the case body and the case cover.

Preferably, both the case body and the case cover are made of foam.

Preferably, the sealed bag is provided with a plurality of cylinders closed at both ends, and the phase-transition material is filled in interiors of the cylinders and gaps between the cylinders.

Preferably, the plurality of cylinders are divided into a plurality of rows, and axes of each row of the cylinders are located in a same plane, and end surfaces of each of the cylinders are tangent to end surfaces of two of the cylinders of a neighboring row.

Another purpose of the present application is to provide a long-distance transportation method by means of the said transportation case for black soldier fly eggs and larvae, which comprises: placing black soldier fly eggs, larvae and padding into the egg boxes, sealing ventilation holes on the egg boxes with breathable tissues, placing the egg boxes inside the transportation case, placing one of the plurality of insulation components above the egg boxes, covering with the case cover, and sealing the transportation case for transportation.

With the above-mentioned technical solution, the problem of reduced egg hatching rate due to fluctuations in environmental temperature can be improved. The insulation boards produced according to this application have a phase-transition temperature range of 17-22° C. and exhibit excellent heat insulation and preservation performance. They can maintain a stable temperature within the foam box, thus protecting the eggs and larvae. The insulation boards are solid in their normal state, with 1,3-2,4-bis(3,4-dimethyl) benzylidene sorbitol serving as a nucleating agent. The insulation boards can isolate heat and reduce heat conduction between the foam box and the outside, ensuring that the temperature within the foam box remains within the suitable range for the eggs and larvae. When the temperature inside the foam box exceeds the phase-transition temperature of the insulation boards, the insulation boards will transition to a liquid state and absorb the heat within the foam box. At this point, the liquid insulation material forms a liquid bag within the sealed bag, still providing insulation and protection for the eggs and larvae.

The present application utilizes foam case with heat insulation and preservation property, together with insulation boards set on the case's inner walls, greatly enhancing the foam case's heat insulation and preservation performance and temperature-control effect, which can slow down the temperature change inside the case; in addition, the padding in the egg box has good air permeability and pressure-cushioning properties, which can significantly improve the hatching rate of the eggs.

Preferably, the padding is made of one or more materials selected from the group consisting of wood chips, wood shavings, rice straw, rice straw powder, puffed corn power, alfalfa hay, and timothy hay.

Preferably, the padding is made of a mixture of wood chips, rice straw powder and rice straw, and the wood chips and the rice straw powder are evenly mixed as a lower padding in which the wood chips account for 20%~50% by weight percentage, and the straw is spread on top of a mixture of the wood chips and the rice straw powder as an upper padding, and the upper padding covers the lower padding completely with the black soldier fly eggs and larvae mixed in the lower padding.

Preferably, in the lower padding, the wood chips and the rice straw powder have a weight ratio of 1:1.

After tests, it has been found that padding composition with the above ratio is conducive to improving the egg hatching rate.

Preferably, the weight of the black soldier fly eggs and larvae is 1.5~4 times of that of the lower padding.

With the above-mentioned technical solution, the lower padding has a cushioning and damping effect on the eggs and larvae, which is conducive to protecting the eggs and larvae. However, when the weight of the eggs and larvae exceeds 4 times the weight of the lower padding, there is relatively too little lower padding compared to the eggs and larvae, which will reduce the cushioning and damping effect. Additionally, if there are excessive eggs and larvae within the foam box, the oxygen content will be consumed rapidly, leading to a decrease in the egg hatching rate.

Preferably, the egg boxes are placed in the foam case in one or two layers and are arranged in a rectangular array with a number of the egg boxes in a bottom layer recorded as M, $$M = \left[\frac{A-2d}{10}\right] \times \left[\frac{B-2d}{10}\right],$$

wherein [X] denotes rounding; A is a length of a longer side on an inner bottom surface of the foam case, and A≤70 cm; and B is a length of a shorter side on an inner bottom surface of the foam case, and B≤50 cm; and d is a thickness of the insulation board, and 1 cm≤d≤5 cm; and a height of an inner space of the foam case is 22~25 cm; when the egg boxes are placed in the foam case in two layers, the number of the egg boxes in an upper layer recorded as N, $$N = \left(\left[\frac{A-2d}{10}\right]-1\right) \times \left[\frac{B-2d}{10}\right] \text{ or } N = \left[\frac{A-2d}{10}\right] \times \left(\left[\frac{B-2d}{10}\right]-1\right),$$

and the egg boxes in the upper layer are staggered with the egg boxes in a lower layer.

After tests, it has been found that such control for the placement of eggs and larvae makes it possible to transport the eggs and larvae with the optimal economic efficiency and reduce the loss in the transportation process at the same time.

In summary, the present application includes at least one of the following beneficial technical effects:

1. The present application adopts the foam case with good heat insulation and preservation properties as the transportation container, and the foam case is provided with insulation boards set on its inner walls, so that its heat insulation and preservation performance is greatly enhanced and its temperature-control effect is improved, which can slow down the temperature change inside the case; in addition, the padding in the egg box has good air permeability and pressure-cushioning properties; the combination of all above properties can significantly improve the hatching rate of the eggs.
2. The present application makes it possible to transport the eggs and larvae with the optimal economic efficiency and reduce the loss of eggs and larvae in the transportation process at the same time by controlling the placement of eggs and larvae.
3. The transportation case of the present application is designed based on the transportation method of the present application, and can be used to substitute for the traditional cardboard case to solve the problem that eggs and larvae are likely to die during transportation due to drastic temperature changes.

Description of the accompanying markings: 1, case body; 11, concave rim; 2, case cover; 21, convex rim; 3, insulation component; 31, sealed bag; 32, dispersing part; 4, sealing layer; 5, insulation layer; 51, aluminum foil layer; 52, pearl cotton layer.

DETAILED DESCRIPTION OF THE EMBODIMENTS

In order to facilitate a better understanding of the technical solutions of the present application, a further detailed explanation of the present application is provided below in conjunction with tables, examples, and embodiments, but is not intended to limit the scope of protection defined by the present application.

One embodiment of the present application provides a transportation case for transporting the black soldier fly eggs and larvae over long distance, and the transportation case is further described in detail in conjunction with the accompanying drawings.

Figure 2:
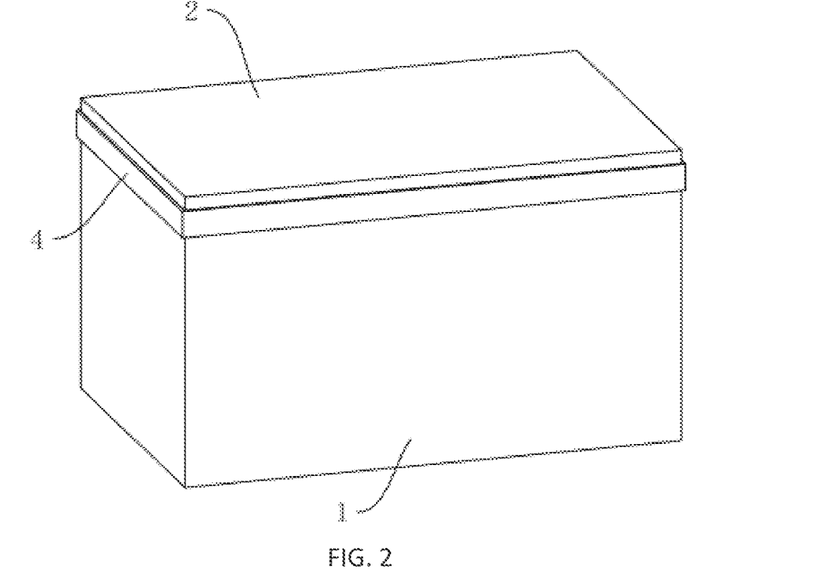
FIG. 2 is an overall schematic diagram of a transportation case in an embodiment of the present application.

Referring to FIG. 2, the transportation case for the eggs and larvae includes a case body 1 and a case cover 2, the case body 1 and the case cover 2 are made of foam, and the foam can be polystyrene foam, polyurethane foam, phenolic foam, EPS foam, XPS foam, etc., which is not specifically limited by the present embodiment. Foam has good heat insulation and preservation performance, which can improve the heat insulation and preservation effect of the transportation case, thus avoiding the drastic temperature change inside the transportation case; and foam also has good cushioning and damping performance, which can reduce the vibration suffered by the eggs and larvae during the transportation process, and is conducive to improving the survival rate of eggs and larvae.

Figure 3:
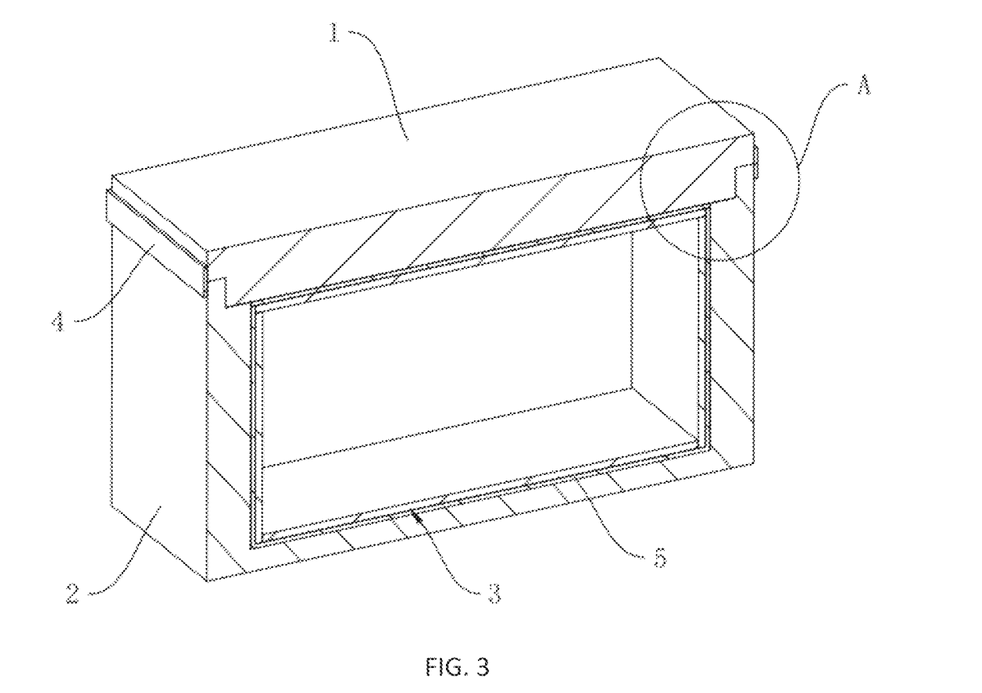
FIG. 3 is a cross-sectional schematic diagram of a transportation case in an embodiment of the present application.
Figure 4:
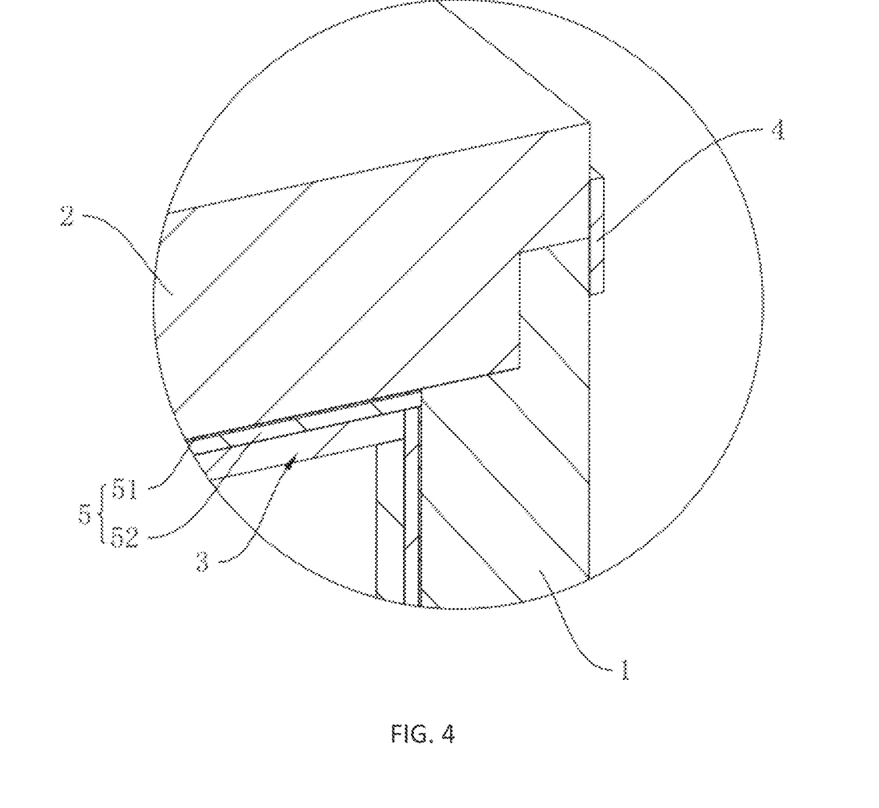
FIG. 4 is an enlarged schematic diagram of part A of FIG. 3.

Referring to FIGS. 3 and 4, an insulation layer 5 is bonded to the inner walls of the case body 1 and the case cover 2, the insulation layer 5 comprises an aluminum foil layer 51 and a pearl cotton layer 52 which are bonded together, with the aluminum foil layer 51 being adhered to the inner walls of the case body 1 and the case cover 2, and the pearl cotton layer 52 being adhered to the other side of the aluminum foil layer 51. Aluminum foil and pearl cotton have good heat insulation and preservation performance, which is conducive to improving the survival rate of eggs and larvae, and the pearl cotton layer 52 also has a certain degree of damping property, which can further reduce the vibration suffered by the eggs and larvae during the transportation process, which is conducive to the survival of the eggs and larvae.

Figure 5:
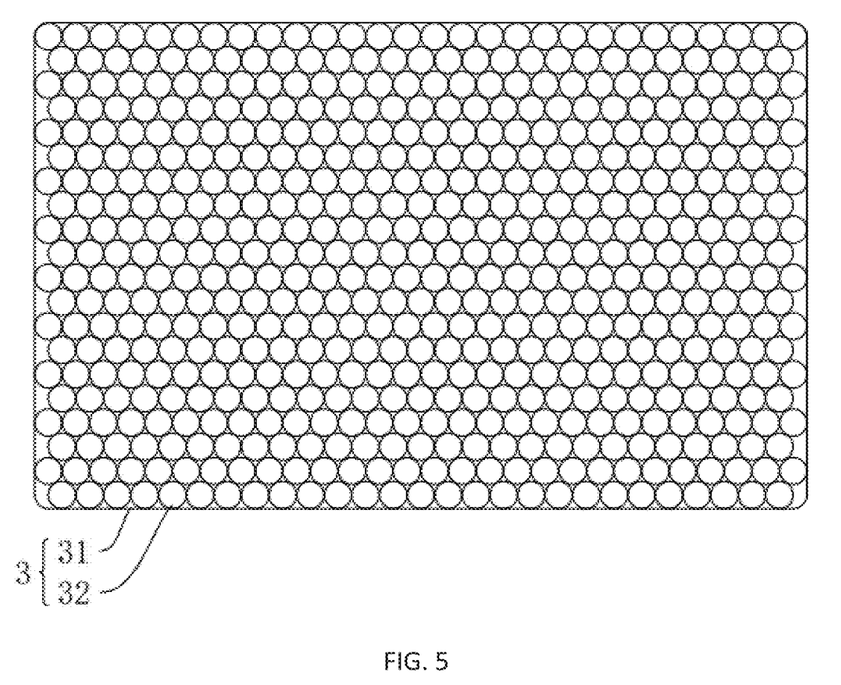
FIG. 5 is a cross-sectional schematic diagram of an insulation component in a flat position in an embodiment of the present application.

Referring to FIGS. 3 to 5, the case body 1 is also provided with a plurality of insulation components 3, the insulation components 3 are located at the inner side of the insulation layer 5, and the insulation component 3 comprise a sealed bag 31, a dispersing part 32 placed inside the sealed bag, and phase-transition material filled inside the dispersing part 32 as well as between the sealed bag 31 and the dispersing part 32. When the temperature outside is higher than the temperature of the phase-transition material, the phase-transition material will absorb heat and become fluid, thus reducing the transfer of high from outside to the inside of the foam case, which can play the role of heat insulation. When the temperature outside is lower than the temperature of the phase-transition material, the phase-transition material is in solid state and can provide insulation against cold.

In this embodiment, six pieces of insulation components 3 are provided, forming a rectangular holding space where the eggs and larvae are placed during transportation. Because of the heat insulation and preservation property of the insulation components 3, there will not be drastic temperature change in the holding space, which means the foam case has good temperature-control effect and is able to make the temperature inside the transportation case remain stable, which is conducive to enhancing the egg and larvae survival rate and egg hatching rate. In other embodiments, the number of insulation components 3 corresponding to each of the six faces of the holding space may also be more than two for better temperature control.

In this embodiment, the phase-transition material is made from a mixture of butyl stearate, vinyl butyrate, glyceryl tripalmitate, glyceryl trimyristate, and 1,3-2,4-bis(3,4-dimethyl)benzylidene sorbitol, and the phase-transition temperature range is 17~22° C., which is conducive to maintaining the inside of the transport case at a temperature suitable for the survival of the eggs and larvae.

Referring to FIG. 5, the dispersing part 32 comprises a plurality of cylinders closed at both ends spliced together sequentially, with end surfaces of the cylinders tangent to each other sequentially, and the interiors of the cylinders and the gaps between the cylinders filled with the phase-transition material. The plurality of cylinders are divided into a plurality of rows, and the axes of each row of cylinders are located in the same plane, and the end surfaces of each cylinder are tangent to the end surfaces of two of the cylinders of the neighboring rows, that is, the cylinders of the neighboring rows are staggered in position, so as to form a three-circle tangent connection structure between the cylinders, securing a more stable structure for the dispersing part 32.

The number of cylinders contained in the dispersing part 32 is subjected to the fact that the total volume of all the cylinders and gaps between the cylinders approximates the volume of the sealed bag 31 fully propped up, thus realizing the support for the sealed bag 31, and making the external structure of the insulation component 3 approximate the external contour of the dispersing part 32, so that the insulation component 3 can always maintain a more fixed contour during the phase transition of the phase-transition material, which is conducive to achieving a more stable heat insulation and preservation effect. Since both ends of the cylinder are closed, the phase transition process of the phase-transition material within the cylinders is fixed in a specific area, preventing the phase-transition material from concentrating and gathering in a certain area and narrowing the temperature control area, so that the insulation component 3 can cover the temperature control area of the egg box; and the phase-transition material within the gap between the cylinders allows the temperature control area of the insulation component 3 to be as complete as possible, which is conducive to improving the temperature control effect.

Figure 6:
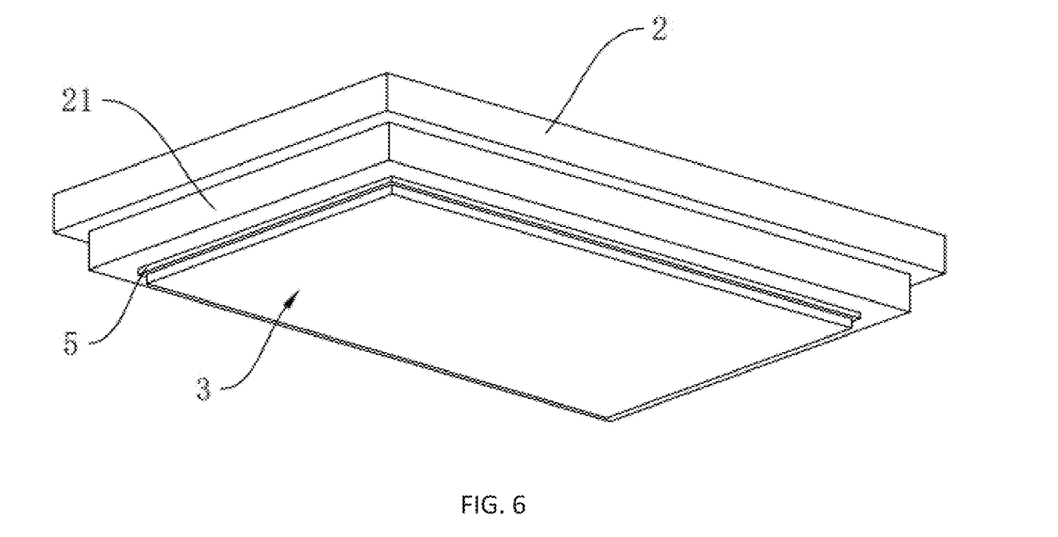
FIG. 6 is a structural schematic diagram of a cover of a transportation case in an embodiment of the present application.
Figure 7:
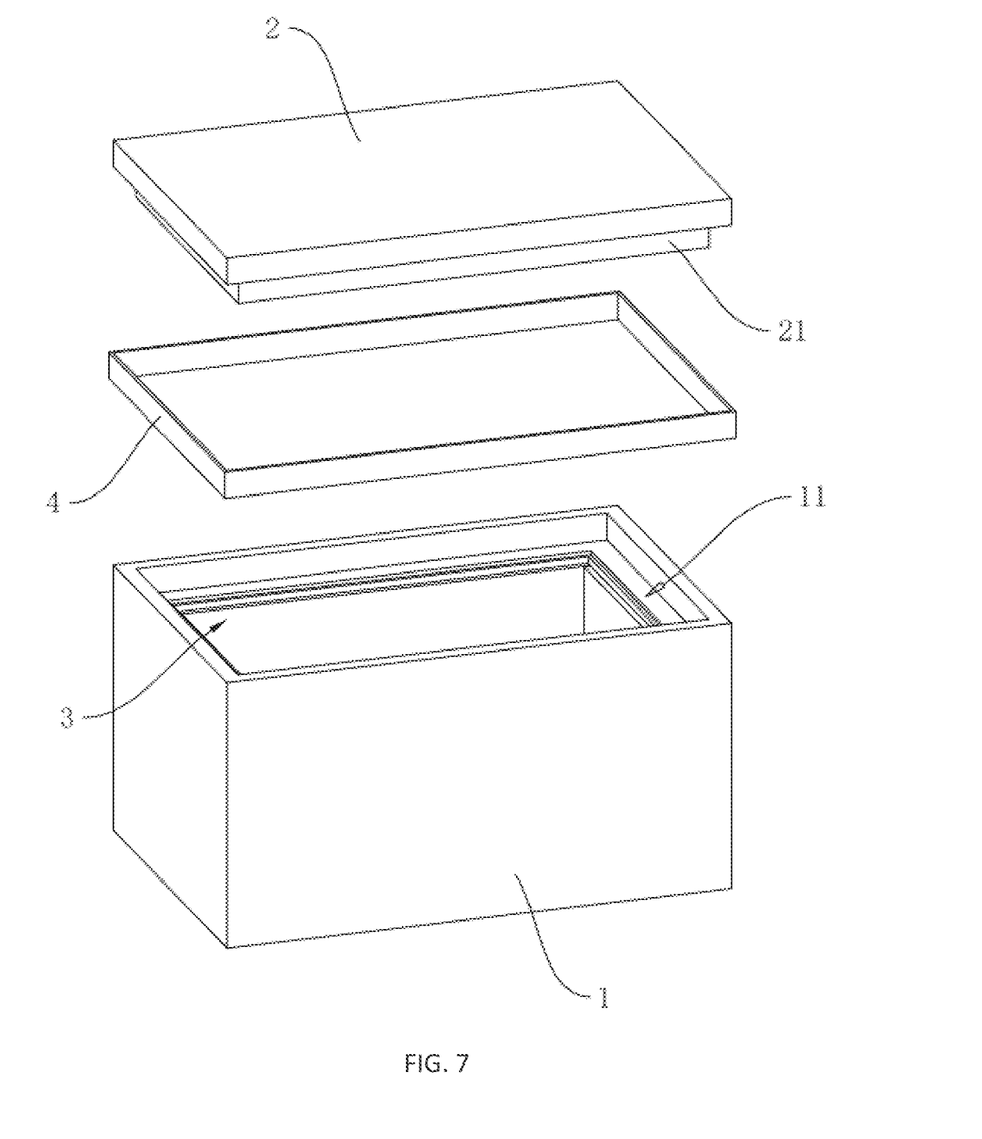
FIG. 7 is an exploded schematic diagram of a transportation case in an embodiment of the present application.

Referring to FIGS. 6 and 7, a concave rim 11 is provided at the top of the case body 1 near the inner wall along the opening contour of the case body 1, and a convex rim 21 is provided on the inner wall of the case cover 2 to fit into the concave rim 11. When the case cover 2 matches with the case body 1, the convex rim 21 is just embedded in the concave rim 11, thereby improving the firmness and sealing effect of the matching between the case body 1 and the case cover 2, reducing the transfer of heat, and thereby contributing to the enhancement of the egg and larvae survival rate.

Referring to FIG. 2, there is also a sealing layer 4 adhered to the outer wall of the case body 1, and the gap between the case body 1 and the case cover 2 is sealed by the sealing layer 4, so that the transportation case is kept in a sealed state, further reducing the magnitude of the internal temperature change, which is conducive to enhancing the egg and larvae survival rate; and such sealing also enables the case body 1 to be securely connected with the case cover 2, avoiding loosening of the case cover 2 during transportation. The sealing layer 4 may be made of tape, sealant, or other adhesive substance capable of performing a sealing function, which is not specifically limited by the present application.

The implementation principle of the transportation case for black soldier fly eggs and larvae provided by this application is as follows: In the present application, phase-transition material is filled in the sealed bag 31 and dispersed through the dispersing part 32, maintaining a stable temperature in the space where the egg boxes are located as much as possible; when the temperature outside is higher than the temperature of the phase-transition material, the phase-transition material will absorb heat and become fluid, thus reducing the transfer of high from outside to the inside of the foam case, which can play the role of heat insulation; and when the temperature outside is lower than the temperature of the phase-transition material, the phase-transition material is solid and can provide insulation against cold; the phase transition process of phase-transition material is utilized to realize temperature control inside the transportation case, thus reducing the magnitude of the internal temperature change inside the transportation case, which is conducive to enhancing the egg and larvae survival rate and egg hatching rate.

The method of transporting the eggs and larvae over long distance is described in detail as follows:

Example 1

Long-distance transportation method for of black soldier fly eggs and larvae: The eggs, larvae and the padding were packed into the egg boxes, and the breathable tissues were used to seal the air holes on the egg boxes to prevent the padding, the eggs or the larvae from leaking; in this example, the padding adopted was straw, and the weight of the eggs and larvae in each egg box was 35 g, and the straw was spread on the top of the eggs and larvae and covered them completely.

The five inner wall surfaces of the foam case was provided with insulation boards placed in sealed plastic bags against the wall, and the egg boxes were placed in the foam case in two layers; the upper and lower layers of the egg boxes were arranged in a rectangular array with the number of the egg boxes in the bottom layer recorded as M, $$M = \left[\frac{A-2d}{10}\right] \times \left[\frac{B-2d}{10}\right],$$

and the number of the egg boxes in the upper layer recorded as N, $$N = \left(\left[\frac{A-2d}{10}\right] - 1\right) \times \left[\frac{B-2d}{10}\right] \text{ or } N = \left[\frac{A-2d}{10}\right] \times \left(\left[\frac{B-2d}{10}\right] - 1\right),$$

wherein [X] denoted rounding; A was the length of a longer side on the inner bottom surface of the foam case, and A≤70 cm; and B was the length of a shorter side on the inner bottom surface of the foam case, and B≤50 cm; and d was the thickness of the insulation board, and 1 cm≤d≤5 cm; and the height of the inner space of the foam case was 22~25 cm.

Figure 1:
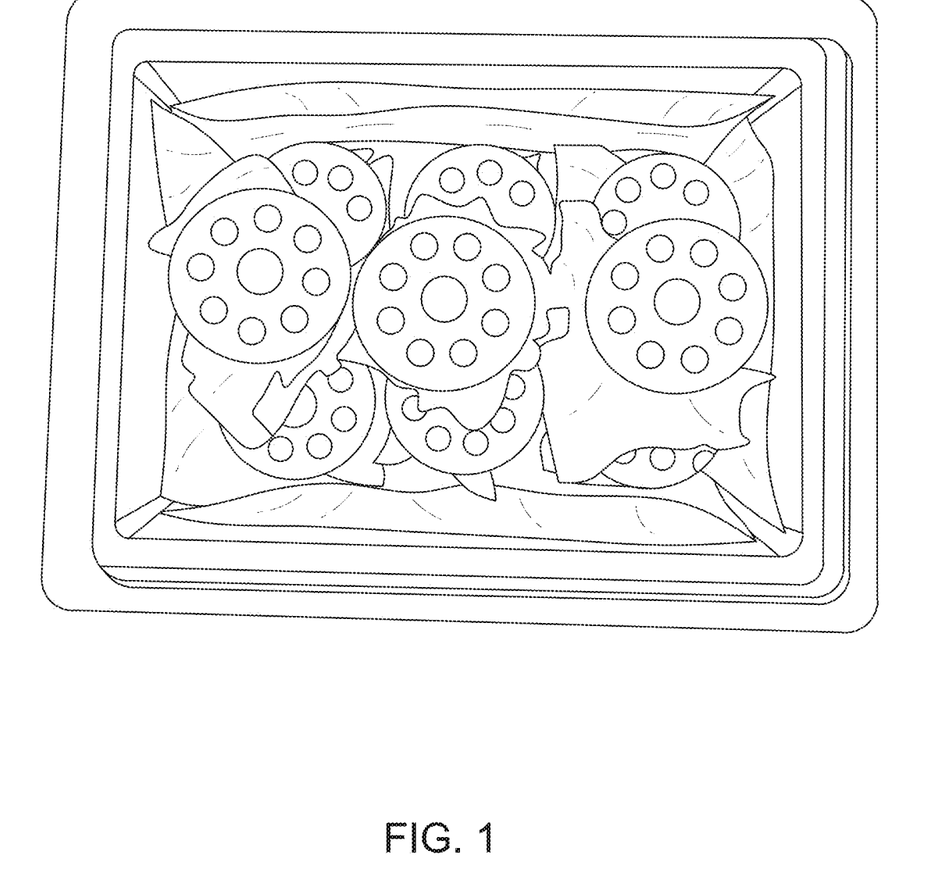
FIG. 1 is a schematic diagram illustrating the placement of egg boxes in Example 1 of the present application.

In this example, A was 37 cm, B was 27 cm, d was 1.5 cm, the height of the inner space of the foam case was 22 cm, M was 6, N was 3, the diameter of the egg boxes was 8 cm with its height being 7 cm, and the egg boxes in the upper layer were placed in a staggered position with the egg boxes in the lower layer as shown in FIG. 1 with the egg boxes in the lower layer placed in a matrix row of 2*3 and the egg boxes in the upper layer placed in a matrix row of 1*3.

Then an insulation board was placed above the egg boxes in a sealed plastic bag, and the insulation boards on the inner walls of the foam case and the insulation board above the egg boxes were against each other in sequence to form a sealed holding space with the egg boxes located inside.

After the placement of the egg boxes, the case cover was closed with the seam between the case body and the case cover of the foam case sealed with adhesive tape, and then the foam case was ready for transportation.

In this example, the material of the insulation board comprises by weight percentage 73% butyl stearate, 20% vinyl butyrate, 3% glyceryl tripalmitate, 3% glyceryl trimyristate, and 1% 1,3-2,4-bis(3,4-dimethyl)benzylidene sorbitol.

The insulation board was prepared by mixing butyl stearate, vinyl butyrate, glyceryl tripalmitate and glyceryl trimyristate, and heating them to 85±5° C., stirring them for 1 hour until the mixture is homogeneous, and then adding 1,3-2,4-bis(3,4-dimethyl)benzylidene sorbitol, and continuing to stir for 30 minutes, and then pouring the mixture into a mould for cooling and molding, and then taking off the mould.

The phase-transition temperature range of the insulation board was 17~22° C., which could maintain the internal temperature of the foam case at 17~22° C. When the temperature inside the foam case exceeded 22° C., the insulation board was transformed from solid to liquid, but it would not be spilled out from the sealed plastic bag, and the insulation material transformed into fluid can still play the role of heat insulation and preservation, and continue to protect the eggs.

Further, based on the above transportation method and the material and performance of the insulation board, the present application provides a transportation case embodiment for implementing the long-distance transportation method of the black soldier fly eggs. The transport box includes a case body and a case cover, and the case body is provided with a plurality of insulation components, which comprises a sealed bag and a phase-transition material filled inside the sealing bag (i. e., the above-mentioned insulation board). The insulation components are enclosed in the case body to form a holding space where the egg box is placed.

Preferably, an insulation layer was provided on both the inner wall of the case body and the case cover.

Preferably, the insulation layer comprises an aluminum foil layer and a pearl cotton layer, with one side of the aluminum foil layer being adhered to the inner walls of the case body and the case cover, and the pearl cotton layer being adhered to the other side of the aluminum foil layer.

Preferably, the outer wall of the case body is provided with a sealing layer, being used to seal the gap between the case body and the case cover.

Preferably, both the case and the case cover are made of foam.

Preferably, the sealed bag is provided with the dispersing part, which comprises a plurality of cylinders closed at both ends spliced together sequentially, with end surfaces of the cylinders tangent to each other sequentially, and the interiors of the cylinders and the gaps between the cylinders filled with the phase-transition material.

Preferably, the cylinders are divided into a plurality of rows, and the axes of each row of cylinders are located in the same plane, and the end surfaces of each cylinder are tangent to the end surfaces of two of the cylinders of the neighboring rows.

It should be noted that in the Examples and Comparative examples of the present application, the padding included powder-like type and straw-like type according to the actual selection. When the padding consisted of powder-like type only, the powder-like padding was mixed evenly with the eggs with a total controlled weight of 50 g. When the padding consisted of straw-like type only, each egg box was filled with 35 g of the eggs with the straw-like padding spread on top of the eggs and covering them completely. When the padding consisted of both powder-like type and straw-like type, the eggs and the powder-like padding in each egg box were evenly mixed with a total controlled weight of 50 g, and the mixture of the eggs and the powder-like padding was covered with the straw-like padding on the top.

It should be noted that, in the Examples and Comparative examples of the present application, straw-like padding included rice straw, alfalfa hay, and timothy hay, while power-like padding included wood chips, rice straw powder, puffed corn powder, wheat bran, and wood shavings. The puffed corn powder refers to the pre-gelatinized starch with a pale yellow color and a fluffy texture which is obtained from corn through the combined action of moisture, heat, mechanical shear, friction, kneading, and pressure difference. Puffed corn powder belongs to common knowledge and thus will not be described further in detail in this example.

Example 2

The difference between Example 2 and Example 1 was that in Example 2, the padding was made of puffed corn powder; in the egg box, the weight of the eggs and larvae was 35 g, the weight of the puffed corn powder was 15 g, and the puffed corn powder was evenly mixed with the eggs.

Example 3

The difference between Example 3 and Example 1 was that in Example 3, the padding was made of rice straw powder; in the egg box, the weight of the eggs and larvae was 35 g, the weight of the rice straw powder was 15 g, and the rice straw powder was evenly mixed with the eggs.

Example 4

The difference between Example 4 and Example 1 was that in Example 4, the padding was made of wheat bran; in the egg box, the weight of the eggs and larvae was 35 g, the weight of the wheat bran was 15 g, and the wheat bran was evenly mixed with the eggs.

Example 5

The difference between Example 5 and Example 1 was that in Example 5, the padding was made of wood chips; in the egg box, the weight of the eggs was 35 g, the weight of the wood chips was 15 g, and the wood chips were evenly mixed with the eggs.

Example 6

The difference between Example 6 and Example 1 was that in Example 6, the padding was made of wood shavings; in the egg box, the weight of the eggs and larvae was 35 g, the weight of the wood shavings was 15 g, and the wood shavings were evenly mixed with the eggs.

Example 7

The difference between Example 7 and Example 1 was that in Example 7, the padding was made of alfalfa hay; in the egg box, the weight of the eggs and larvae was 35 g, and the eggs were covered with the alfalfa hay on the top.

Example 8

The difference between Example 8 and Example 1 was that in Example 8, the padding was made of timothy hay; in the egg box, the weight of the eggs and larvae was 35 g, and the eggs were covered with the timothy hay on the top.

With references to Examples 1-8, Comparative examples 9-16 were set up respectively, and the differences between Comparative examples 9-16 and Examples 1-8 were that in Comparative examples 9-16, the materials of the insulation boards comprised by weight percentage 75% butyl stearate, 18% vinyl butyrate, 2% glyceryl tripalmitate, 2% glyceryl trimyristate, and 3% 1,3-2,4-bis(3,4-dimethyl)benzylidene sorbitol.

Verification Test

With references to Examples 1-8, Comparative examples 1-8 were set up respectively, and the differences between Comparative examples 1-8 and Examples 1-8 were that in Comparative examples 1-8, cardboard cases with holes punched were used for transportation in the summer, and foam cases without insulation boards were used for transportation in the winter.

With reference to Examples 1-8, Comparative examples 9-16 were set up respectively, and the differences between Comparative examples 9-16 and Examples 1-8 were that, foam cases with ice bags were used for transportation in the summer, and no tests were carried out in the winter.

Examples 1-16 and Comparative examples 1-8 were transported for 3 days in summer (August) and winter (December) respectively, and Comparative examples 9-16 were transported for 3 days in summer (August) only, with Nanning city of Guangxi province as the place of departure, and Zunyi city of Guizhou province as the place of destination, and three sets of parallel tests were conducted for each of the Examples and Comparative examples respectively.

Examples 1-16 and Comparative examples 1-16 were synchronized tests, i.e., they were loaded on the same vehicle at the same time for the transportation tests, and the temperature ranges during the whole tests were 26~40° C. in summer and −2~8° C. in winter.

Hatching Rate Calculation:

Experiment for calculating the number of the eggs per gram: weighed 30 different portions of eggs, each portion of 2 mg (accurate to 0.1 mg), put them into a petri dish, added alcohol to disperse them, then observed them, and took pictures when there was no overlap and counted them with the pictures, thus the number of the eggs per gram was estimated to be about 40,000 eggs/g.

After the eggs arrived at the place of destination, 1 box of the eggs with padding was taken out from each set of parallel tests and put into different large plastic boxes respectively, and then added with chicken feed as the culture material, and nursed for 7 days under constant temperature and humidity with the temperature controlled at 28° C. and humidity controlled at 65%. After nursing, the plastic box was taken out, the number of larvae was counted, and the hatching rate was calculated. Hatching rate=the number of larvae hatched in a single box/(mass of eggs in a single box×the number of eggs per gram), and the specific data are shown in Table 1. And the survival rate of larvae=the number of survive larvae/total larvae in the egg box.

TABLE 1

Padding compositions and egg hatching rates and larval survival rate in Examples 1-16 and Comparative examples 1-16

| | Padding composition | | Summer | | | Winter | | |
|---|---|---|---|---|---|---|---|---|
| Example 1 | Rice straw | Hatching rate | 60.30% | 60.76% | 60.20% | 5.39% | 5.25% | 5.07% |
| | | Survival rate | 78.11% | 78.56% | 77.87% | 64.55% | 65.13% | 64.21% |

TABLE 1-continued

Padding compositions and egg hatching rates and larval survival rate in Examples 1-16 and Comparative examples 1-16

| | Padding composition | | Summer | | | Winter | | |
|---|---|---|---|---|---|---|---|---|
| Example 2 | Puffed corn power | Hatching rate | 51.23% | 51.28% | 52.11% | 11.01% | 11.61% | 11.60% |
| | | Survival rate | 68.16% | 68.89% | 67.91% | 76.12% | 77.03% | 76.85% |
| Example 3 | Rice straw powder | Hatching rate | 61.82% | 61.95% | 61.45% | 12.55% | 12.29% | 12.09% |
| | | Survival rate | 72.77% | 73.11% | 72.65% | 82.21% | 83.02% | 82.73% |
| Example 4 | Wheat bran | Hatching rate | 72.14% | 72.06% | 71.95% | 15.65% | 15.38% | 15.14% |
| | | Survival rate | 85.55% | 85.69% | 84.92% | 84.42% | 84.64% | 85.0 |
| Example 5 | Wood chips | Hatching rate | 67.37% | 66.38% | 66.27% | 13.47% | 13.83% | 13.54% |
| | | Survival rate | 80.32% | 79.67% | 79.81% | 77.77% | 77.61% | 78.11% |
| Example 6 | Wood shavings | Hatching rate | 53.46% | 54.40% | 55.11% | 11.21% | 11.48% | 11.74% |
| | | Survival rate | 73.31% | 73.29% | 72.89% | 70.02% | 70.82% | 70.00% |
| Example 7 | Alfalfa hay | Hatching rate | 59.89% | 58.99% | 59.20% | 4.83% | 4.64% | 4.37% |
| | | Survival rate | 75.79% | 75.18% | 75.43% | 62.22% | 62.19% | 62.34% |
| Example 8 | Timothy hay | Hatching rate | 50.77% | 52.15% | 51.03% | 4.42% | 4.22% | 4.31% |
| | | Survival rate | 70.00% | 70.52% | 70.19% | 61.11% | 61.08% | 61.21% |
| Example 9 | Rice straw | Hatching rate | 61.49% | 61.98% | 62.42% | 6.87% | 6.62% | 6.67% |
| | | Survival rate | 81.62% | 81.58% | 82.05% | 66.66% | 67.13% | 66.82% |
| Example 10 | Puffed corn power | Hatching rate | 52.20% | 54.29% | 51.06% | 12.24% | 12.16% | 11.09% |
| | | Survival rate | 71.71% | 71.89% | 72.10% | 78.88% | 78.73% | 78.82% |
| Example 11 | Rice straw powder | Hatching rate | 62.10% | 64.27% | 62.74% | 13.73% | 13.62% | 13.55% |
| | | Survival rate | 82.31% | 83.02% | 82.79% | 86.37% | 86.18% | 86.29% |
| Example 12 | Wheat bran | Hatching rate | 74.60% | 73.50% | 73.39% | 16.78% | 16.67% | 16.84% |
| | | Survival rate | 93.31% | 93.45% | 93.19% | 90.79% | 91.08% | 89.89% |
| Example 13 | Wood chips | Hatching rate | 68.65% | 67.64% | 67.53% | 14.35% | 14.63% | 14.59% |
| | | Survival rate | 87.32% | 87.11% | 86.91% | 80.63% | 81.25% | 81.10% |
| Example 14 | Wood shavings | Hatching rate | 55.58% | 55.54% | 56.27% | 12.42% | 12.65% | 12.53% |
| | | Survival rate | 75.55% | 75.34% | 75.67% | 75.19% | 75.00% | 74.87% |
| Example 15 | Alfalfa hay | Hatching rate | 61.15% | 60.23% | 60.44% | 5.64% | 5.78% | 5.48% |
| | | Survival rate | 80.21% | 80.18% | 80.09% | 65.61% | 65.47% | 65.29% |
| Example 16 | Timothy hay | Hatching rate | 52.84% | 52.25% | 52.10% | 5.03% | 5.18% | 5.27% |
| | | Survival rate | 72.12% | 71.14% | 72.06% | 64.32% | 64.71% | 64.28% |
| Comparative example 1 | Rice straw | Hatching rate | 38.03% | 39.76% | 38.43% | 0 | 0 | 0 |
| | | Survival rate | 47.29% | 46.69% | 46.23% | 15.71% | 14.92% | 15.00% |
| Comparative example 2 | Puffed corn power | Hatching rate | 35.18% | 35.67% | 35.42% | 2.35% | 2.16% | 2.51% |
| | | Survival rate | 42.32% | 43.11% | 42.76% | 20.11% | 21.59% | 20.77% |
| Comparative example 3 | Rice straw powder | Hatching rate | 39.22% | 38.97% | 39.15% | 3.83% | 3.52% | 3.74% |
| | | Survival rate | 47.08% | 47.29% | 48.11% | 26.62% | 26.41% | 26.57% |

TABLE 1-continued

Padding compositions and egg hatching rates and larval survival rate in Examples 1-16 and Comparative examples 1-16

| | Padding composition | | Summer | | | Winter | | |
|---|---|---|---|---|---|---|---|---|
| Comparative example 4 | Wheat bran | Hatching rate | 42.61% | 43.95% | 42.49% | 4.53% | 4.37% | 4.21% |
| | | Survival rate | 52.21% | 52.79% | 52.55% | 31.89% | 31.47% | 31.52% |
| Comparative example 5 | Wood chips | Hatching rate | 40.82% | 40.01% | 40.65% | 4.01% | 3.96% | 3.84% |
| | | Survival rate | 50.21% | 49.87% | 50.61% | 27.87% | 28.10% | 27.63% |
| Comparative example 6 | Wood shavings | Hatching rate | 36.58% | 36.18% | 36.44% | 3.07% | 2.95% | 2.97% |
| | | Survival rate | 45.53% | 44.79% | 45.10% | 25.59% | 25.67% | 25.09% |
| Comparative example 7 | Alfalfa hay | Hatching rate | 37.81% | 37.54% | 37.62% | 0 | 0 | 0 |
| | | Survival rate | 43.39% | 43.61% | 43.73% | 10.62% | 11.12% | 10.98% |
| Comparative example 8 | Timothy hay | Hatching rate | 32.72% | 30.39% | 31.48% | 0 | 0 | 0 |
| | | Survival rate | 38.87% | 38.62% | 38.35% | 8.25% | 8.37% | 8.89% |
| Comparative example 9 | Rice straw | Hatching rate | 26.19% | 27.01% | 26.12% | — | — | — |
| | | Survival rate | 35.12% | 34.97% | 35.65% | — | — | — |
| Comparative example 10 | Puffed corn power | Hatching rate | 25.09% | 24.59% | 24.99% | — | — | — |
| | | Survival rate | 33.27% | 33.82% | 33.66% | — | — | — |
| Comparative example 11 | Rice straw powder | Hatching rate | 24.11% | 23.95% | 24.06% | — | — | — |
| | | Survival rate | 34.65% | 34.37% | 34.92% | — | — | — |
| Comparative example 12 | Wheat bran | Hatching rate | 23.38% | 24.44% | 23.62% | — | — | — |
| | | Survival rate | 37.72% | 37.05% | 37.48% | — | — | — |
| Comparative example 13 | Wood chips | Hatching rate | 23.24% | 23.07% | 23.12% | — | — | — |
| | | Survival rate | 29.21% | 28.37% | 29.44% | — | — | — |
| Comparative example 14 | Wood shavings | Hatching rate | 22.48% | 22.24% | 22.40% | — | — | — |
| | | Survival rate | 28.87% | 27.79% | 28.25% | — | — | — |
| Comparative example 15 | Alfalfa hay | Hatching rate | 21.62% | 21.92% | 21.77% | — | — | — |
| | | Survival rate | 30.02% | 29.76% | 29.53% | — | — | — |
| Comparative example 16 | Timothy hay | Hatching rate | 20.11% | 18.68% | 19.35% | — | — | — |
| | | Survival rate | 28.85% | 29.12% | 28.66% | — | — | — |

With reference to Examples 1-16, Comparative examples 1-16 and the data in Table 1, it can be seen that the transportation method of the present application can significantly improve the egg hatching rate and the survival rate. Compared with the methods of adopting cardboard cases with holes punched or foam cases with ice bags in summer, and ordinary foam cases in winter, the egg hatching rates and the survival rate in examples of the present application have been significantly improved, showing that the insulation board has a good temperature-control effect no matter whether it is in summer or winter, which is conducive to temperature stability inside the foam case, and can thus improve the egg hatching rate and the survival rate.

With reference to the data of Examples 1-16, it can be seen that the egg hatching rates and the survival rate in Examples 9-16 are slightly higher than those in Examples 1-8, indicating that the adoption of insulating boards with the material compositions in Examples 9-16 was more conducive to improving the egg hatching rate and the survival rate.

Example 17

The difference between Example 17 and Example 9 was that in Example 17, the padding was made of the mixture of wheat bran and wood chips with a weight ratio of 1:1; in the egg box, the weight of the eggs was 35 g, the weight of the padding was 15 g, and the padding was evenly mixed with the eggs.

Example 18

The difference between Example 18 and Example 9 was that in Example 18, the padding was made of the mixture of wheat bran and rice straw powder with a weight ratio of 1:1; in the egg box, the weight of the eggs was 35 g, the weight of the padding was 15 g, and the padding was evenly mixed with the eggs.

Example 19

The difference between Example 19 and Example 9 was that in Example 19, the padding was made of the mixture of wood chips and rice straw powder with a weight ratio of 1:1; in the egg box, the weight of the eggs was 35 g, the weight of the padding was 15 g, and the padding was evenly mixed with the eggs.

Example 20

The difference between Example 20 and Example 9 was that in Example 20, the padding was made of wheat bran and rice straw; in the egg box, the weight of the eggs was 35 g, the weight of the wheat bran was 15 g, the wheat bran was evenly mixed with the eggs, and the mixture was covered with the rice straw on the top.

Example 21

The difference between Example 21 and Example 9 was that in Example 21, the padding was made of wood chips and rice straw; in the egg box, the weight of the eggs was 35 g, the weight of the wood chips was 15 g, the wood chips were evenly mixed with the eggs, and the mixture was covered with the rice straw on the top.

Example 22

The difference between Example 22 and Example 9 was that in Example 22, the padding was made of wood chips, rice straw powder, and rice straw. The mixture of wood chips and rice straw powder was used as the lower padding with a weight ratio of 1:1; in the egg box, the weight of the eggs was 35 g, the weight of the lower padding was 15 g, the lower padding was evenly mixed with the eggs, and the mixture was covered with the rice straw on the top.

Example 23

The difference between Example 23 and Example 9 was that in Example 23, the padding was made of wood chips, rice straw powder, and alfalfa hay. The mixture of wood chips and rice straw powder was used as the lower padding with a weight ratio of 1:1; in the egg box, the weight of the eggs was 35 g, the weight of the lower padding was 15 g, the lower padding was evenly mixed with the eggs, and the mixture was covered with the alfalfa hay on the top.

Control groups 1-5 were set up respectively, with Control group 1 being consistent with Example 4, Control group 2 being consistent with Example 5, Control group 3 being consistent with Example 3, Control group 4 being consistent with Example 1, and Control group 5 being consistent with Example 7.

Tests were conducted on Control groups 1-5 and Examples 17-23 in accordance with the test methods and conditions of the validation tests described above, and three sets of parallel tests were conducted for each of the Examples and Control groups respectively, and the specific data are shown in Table 2.

TABLE 2

Padding compositions and egg hatching rates in control groups 1-5 and Examples 17-23

|  | Padding composition | Hatching rate (summer) | | | Hatching rate (winter) | | |
|---|---|---|---|---|---|---|---|
| Control group 1 | Wheat bran | 74.22% | 72.5% | 72.39% | 15.22% | 15.35% | 15.20% |
| Control group 2 | Wood chips | 67.72% | 66.71% | 67.60% | 13.56% | 13.03% | 13.43% |
| Control group 3 | Rice straw powder | 61.04% | 63.21% | 61.68% | 12.52% | 12.46% | 12.25% |
| Control group 4 | Rice straw | 60.19% | 59.98% | 61.42% | 5.50% | 5.32% | 5.17% |
| Control group 5 | Alfalfa hay | 60.09% | 58.97% | 59.38% | 4.43% | 4.53% | 4.45% |
| Example 17 | Wheat bran:Wood chips = 1:1 | 72.32% | 72.65% | 71.88% | 15.21% | 15.42% | 15.98% |
| Example 18 | Wheat bran:Rice straw powder = 1:1 | 65.44% | 65.12% | 66.33% | 17.77% | 17.65% | 17.71% |
| Example 19 | Wood chips:Rice straw powder = 1:1 | 76.18% | 75.08% | 75.92% | 21.00% | 20.91% | 21.58% |
| Example 20 | Wheat bran + Rice straw | 57.75% | 59.19% | 58.74% | 9.02% | 8.94% | 9.81% |
| Example 21 | Wood chips + Rice straw | 73.05% | 71.08% | 72.63% | 14.84% | 14.64% | 14.27% |
| Example 22 | Wood chips:Rice straw powder = 1:1 Rice straw | 90.10% | 88.60% | 89.03% | 24.11% | 23.64% | 23.87% |
| Example 23 | Wood chips:Rice straw powder = 1:1, Alfalfa hay | 78.21% | 77.45% | 79.58% | 20.43% | 20.25% | 20.17% |

With reference to Control groups 1-5, Examples 17-23 and the data in Table 2, it can be seen that different padding materials also influenced the egg hatching rate. Compared with a single type of padding material, a mixture of different types of padding material is conducive to improving the egg hatching rate. Among the tests, the padding composition in Example 22 performed better, the reason of which was that the wood shavings and rice straw powder were powder-like padding material which could be fully mixed with the eggs, thus reducing moisture loss of the eggs and increasing the egg hatching rate; and the rice straw had a certain degree of heat insulation and preservation property as well, which could effectively prevent the eggs from being subjected to cold or heat.

Example 24

The difference between Example 22 and Example 9 was that in Example 22, the percentage by weight of wood chips in the lower padding was 20%.

Example 25

The difference between Example 22 and Example 9 was that in Example 22, the percentage by weight of wood chips in the lower padding was 40%.

Example 26

The difference between Example 22 and Example 9 was that in Example 22, the percentage by weight of wood chips in the lower padding was 60%.

Control group 6 was set up, being consistent with Example 22.

Tests were conducted on Control groups 6 and Examples 24-26 in accordance with the test methods and conditions of the validation tests described above, and three sets of parallel tests were conducted for each of the Control groups and Examples respectively, and the specific data are shown in Table 3.

TABLE 3

Padding compositions and egg hatching rates in Control group 6 and Examples 24-26

| | Weight ratio of wood chips to rice straw powder | Hatching rate (summer) | | | Hatching rate (winter) | | |
|---|---|---|---|---|---|---|---|
| Control group 6 | 1:1 | 90.85% | 89.46% | 89.93% | 23.72% | 22.86% | 23.43% |
| Example 24 | 1:4 | 73.74% | 72.88% | 72.03% | 15.38% | 16.13% | 15.68% |
| Example 25 | 2:3 | 80.01% | 80.65% | 81.42% | 17.55% | 17.02% | 17.98% |
| Example 26 | 3:2 | 60.34% | 61.18% | 60.93% | 12.85% | 12.02% | 12.71% |

The wood chips are light and more fluffy, which can reduce the friction heat between the eggs, while the straw powder has a certain weight with some beneficial microorganisms, which can improve the heat tolerance of the eggs; while in winter, both wood chips and rice straw powder have the effect of heat preservation, which can reduce the cold damage to the eggs by low temperatures, and the beneficial microorganisms grown in the breeding process can improve the biological activity of the eggs.

From the data in Table 3, it can be seen that when the weight ratio of wood chips to rice straw powder was 1:1, it could effectively inhibit the egg hatching during transportation and also reduce the moisture loss of the eggs, thus improving the hatching rate of the eggs. Therefore, the weight ratio of wood chips to rice straw powder in the lower padding in Example 22 was more preferred.

Example 27

The difference between Example 27 and Example 22 was that in Example 27, in the egg box, the weight of the eggs and the lower padding was 30 g and 20 g respectively, thus constituting a weight ratio of 1.5:1.

Example 28

The difference between Example 28 and Example 22 was that in Example 28, in the egg box, the weight of the eggs and the lower padding was 33.3 g and 16.7 g respectively, thus constituting a weight ratio of 2:1.

Example 29

The difference between Example 29 and Example 22 was that in Example 29, in the egg box, the weight of the eggs and the lower padding was 38.5 g and 11.5 g respectively, thus constituting a weight ratio of 3.3:1.

Example 30

The difference between Example 30 and Example 22 was that in Example 30, in the egg box, the weight of the eggs and the lower padding was 40 g and 10 g respectively, thus constituting a weight ratio of 4:1.

Example 31

The difference between Example 31 and Example 22 was that in Example 31, in the egg box, the weight of the eggs and the lower padding was 42 g and 8 g respectively, thus constituting a weight ratio of 5.25:1.

Control group 7 was set up, being consistent with Example 22.

Tests were conducted on Control groups 7 and Examples 27-31 in accordance with the test methods and conditions of the validation tests described above, and three sets of parallel tests were conducted for each of the Control groups and Examples respectively, and the specific data are shown in Table 4.

TABLE 4

Padding compositions and egg hatching rates in Control group 7 and Examples 27-31

| | Weight ratio of eggs to lower padding | Hatching rate (summer) | | | Hatching rate (winter) | | |
|---|---|---|---|---|---|---|---|
| Control group 7 | 2.3:1 | 90.10% | 88.60% | 89.03% | 22.11% | 21.64% | 21.37% |
| Example 27 | 1.5:1 | 71.21% | 71.74% | 71.08% | 16.79% | 16.19% | 15.42% |
| Example 28 | 2:1 | 81.11% | 80.84% | 80.28% | 20.58% | 20.11% | 19.86% |
| Example 29 | 3.3:1 | 92.22% | 91.89% | 92.04% | 24.83% | 24.24% | 23.31% |
| Example 30 | 4:1 | 80.09% | 79.54% | 80.27% | 21.21% | 20.94% | 20.72% |
| Example 31 | 5.25:1 | 50.74% | 50.17% | 51.03% | 12.22% | 12.01% | 11.85% |
| Control group 7 | 2.3:1 | 90.10% | 88.60% | 89.03% | 22.11% | 21.64% | 21.37% |

With reference to Control group 7, Examples 27-31 and the data in Table 4, it can be seen that when the mixture of wood chips and rice straw powder was used as the lower padding with a weight ratio of 1:1 and the rice straw was used as the upper padding, the weight ratio of the eggs to the lower padding had an effect on the egg hatching rate. As the weight ratio of the eggs to the lower padding increased, the egg hatching rate showed a tendency to first increase and then decrease. This was because the lower powder-like padding had a cushioning and damping effect on the eggs, and when the weight of the eggs increased and the weight of the lower padding decreased, the lower padding's cushioning and damping effect on the eggs was weakened, resulting in a lower egg hatching rate. However, when the weight of the eggs was too small and the weight of lower padding was too much, the lower padding would have some squeezing effect on the eggs and hinder the air flow between the material and the eggs, resulting in a lower egg hatching rate.

When the weight of the eggs exceeded 4 times of that of lower padding, the egg hatching rate decreased significantly. This was because the weight of the lower padding was too little relative to that of the eggs with reduced cushioning and damping effect, and there were too many eggs in the foam case with increased friction between the eggs, resulting in the decrease of the egg hatching rate.

As can be seen from the data in Table 4, a weight ratio of the eggs to the lower padding of about 3.3:1 in Example 29 was preferred for increasing the egg hatching rate.

Comparative Example 17

The difference between Comparative example 17 and Example 29 was that in Comparative example 17, cardboard cases with holes punched were used for transportation in the summer, and foam cases without insulation boards were used for transportation in the winter.

Comparative Example 18

The difference between Comparative example 18 and Example 29 was that in Comparative example 18, the black soldier fly egg box didn't have padding.

Control group 8 was set up, being consistent with Example 29.

Tests were conducted on Control groups 8 and Comparative examples 17-18 in accordance with the test methods and conditions of the validation tests described above, and three sets of parallel tests were conducted for each of the Control groups and Comparative examples respectively, and the specific data are shown in Table 5.

TABLE 5

Egg hatching rates in Control group 8 and Comparative examples 17-18

| | Hatching rate (summer) | | | Hatching rate (winter) | | |
|---|---|---|---|---|---|---|
| Control group 8 | 91.12% | 92.54% | 92.64% | 23.37% | 24.56% | 23.87% |
| Comparative example 17 | 55.17% | 54.89% | 53.81% | 5.21% | 5.12% | 5.28% |
| Comparative example 18 | 20.71% | 20.74% | 20.45% | 2.11% | 2.25% | 2.36% |

With reference to Control Group 8, Comparative examples 17-18 and the data in Table 5, it can be seen that the adoption of the weight ratio of the eggs to padding or the padding composition in Example 29 alone had a limited effect on improving the egg hatching rate, showing that there was a synergistic effect between the weight ratio and padding composition in Example 29 and the foam case with insulation boards in the examples of the present application, which means a combination of the two can greatly improve the egg hatching rate.

Example 30

The difference between Example 30 and Example 29 was that in Example 30, in the foam case, 6 egg boxes were placed in a 2*3 matrix in the lower layer, and 4 egg boxes were placed in a 2*2 matrix in the upper layer, and the upper egg boxes were staggered with the lower egg boxes.

Control group 9 was set up, being consistent with Example 29.

Three sets of parallel tests were conducted on Control groups 9 and Examples 30 in accordance with the test methods and conditions of the validation tests described above, and the specific data are shown in Table 6.

TABLE 6

Egg hatching rates in Control group 9 and Example 30

| | Hatching rate (summer) | | | Hatching rate (winter) | | |
|---|---|---|---|---|---|---|
| Control group 9 | 91.72% | 92.09% | 92.24% | 24.23% | 23.45% | 24.86% |
| Example 30 | 88.12% | 87.69% | 87.32% | 21.53% | 21.82% | 20.98% |

With reference to the data in Table 6, it can be seen that the hatching rate of the eggs in Example 30 was lower than that in Control group 9, the reason of which was that the number of egg boxes in Example 30 was larger than that in Control 9, showing that in a limited space, with the size of the egg boxes and the environment in which the eggs are placed taken into account, when the number of the egg boxes placed is smaller, the consumption of the oxygen content in the foam case is less, which is better for the transportation of the eggs. However, in terms of economic efficiency, the fewer egg boxes placed per foam case, the higher the production cost, which is not in line with the actual needs of production. Therefore, in the present application, the density of the egg boxes placed is controlled by placing egg boxes in the upper layer and egg boxes in the lower layer in a staggered position; such placement can not only meet the eggs' needs for survival environment, but also maximize economic benefits for transportation.

In summary, the transportation method for the eggs and larvae of the present application can greatly improve the hatching rate of the eggs. By adopting foam cases with insulation boards together with specific padding composition which has a synergistic effect, and controlling the number of the egg boxes placed in the foam case, the transportation method of the present application can reduce the impact of different regions and climates on the eggs and larvae during transportation, making the eggs and larvae less susceptible to drastic temperature changes. Therefore, the transportation method of the present application is highly promising for practical applications.

The specific examples and embodiments are only an explanation of the present application instead of a limitation for the present application, and modifications may be made by person skilled in the art to the examples and embodiments without creative contribution as needed after reading the present description, but as long as the modifications are within the scope of the claims of the present application, they are all protected by the patent law.

What is claimed is:

1. A long-distance transportation method for transportation of black soldier fly eggs and larvae using a transportation case, the method comprising:
   providing the transportation case comprising a case body, a case cover, and a plurality of insulation components placed inside the case body to form a holding space, wherein each insulation component of the plurality of insulation components comprises a sealed bag filled with a phase-transition material having a phase-transition temperature range of 17° C. to 22° C. at which the phase-transition material transitions from solid to fluid;
   placing the black soldier fly eggs, larvae, and padding into egg boxes;
   sealing ventilation holes on the egg boxes with breathable tissues;
   placing the egg boxes into the holding space inside the transportation case;
   placing one of the plurality of insulation components inside the transportation case above the egg boxes, the egg boxes covered with the case cover; and
   sealing the transportation case for transportation.

2. The transportation method of claim 1, wherein the padding is made of one or more materials selected from the group consisting of wood chips, wood shavings, rice straw, rice straw powder, puffed corn power, alfalfa hay, and timothy hay.

3. The transportation method of claim 1, wherein the padding is made of a mixture of wood chips, rice straw powder and rice straw, and the wood chips and the rice straw powder are evenly mixed as a lower padding in which the wood chips account for 20%~50% by weight percentage, and the straw is spread on top of a mixture of the wood chips and the rice straw powder as an upper padding, and the upper padding covers the lower padding completely with the black soldier fly eggs and larvae mixed in the lower padding.

4. The transportation method of claim 3, wherein in the lower padding, the wood chips and the rice straw powder have a weight ratio of 1:1.

5. The transportation method of claim 3, wherein the weight of the black soldier fly eggs and larvae is 1.5~4 times of that of the lower padding.

6. The transportation method of claim 1, wherein the egg boxes are placed in the transportation case in one or two layers and are arranged in a rectangular array with a number of the egg boxes in a bottom layer recorded as M, $$M = \left[\frac{A-2d}{10}\right] \times \left[\frac{B-2d}{10}\right],$$

wherein [X] denotes rounding; A is a length of a longer side on an inner bottom surface of the transportation case, and A≤70 cm; and B is a length of a shorter side on an inner bottom surface of the transportation case, and B≤50 cm; and d is a thickness of the insulation board, and 1 cm≤d≤5 cm; and a height of an inner space of the transportation case is 22~25 cm; when the egg boxes are placed in the transportation case in two layers, a number of the egg boxes in an upper layer recorded as N, $$N = \left(\left[\frac{A-2d}{10}\right]-1\right) \times \left[\frac{B-2d}{10}\right] \text{ or } N = \left[\frac{A-2d}{10}\right] \times \left(\left[\frac{B-2d}{10}\right]-1\right),$$

and the egg boxes in the upper layer are staggered with the egg boxes in a lower layer.

* * * * *